United States Patent
Riach et al.

(10) Patent No.: US 7,941,645 B1
(45) Date of Patent: May 10, 2011

(54) ISOCHRONOUS PIPELINED PROCESSOR WITH DETERMINISTIC CONTROL

(75) Inventors: Duncan A. Riach, East Sussex (GB); Leslie E. Neft, Mountain View, CA (US); Michael A. Ogrinc, San Francisco, CA (US); Wayne Douglas Young, Milpitas, CA (US)

(73) Assignee: NVIDIA Corporation, Santa Clara, CA (US)

(*) Notice: Subject to any disclaimer, the term of this patent is extended or adjusted under 35 U.S.C. 154(b) by 359 days.

(21) Appl. No.: 10/901,887

(22) Filed: Jul. 28, 2004

(51) Int. Cl.
*G06F 9/315* (2006.01)
(52) U.S. Cl. ...................................................... 712/220
(58) Field of Classification Search .................... 712/220
See application file for complete search history.

(56) References Cited

U.S. PATENT DOCUMENTS 5,471,626 A * 11/1995 Carnevale et al. ............. 712/219
5,777,601 A * 7/1998 Baker et al. ................... 345/603
5,933,627 A * 8/1999 Parady ........................... 712/228
6,321,289 B1 * 11/2001 Engfer et al. .................. 710/260
2005/0024512 A1 * 2/2005 Moini et al. ................... 348/294

OTHER PUBLICATIONS

Patterson, David. Hennessy, John. "Computer Architecture: A Quantitative Approach". Morgan Kaufmann Publishers, Second Edition, 1996. pp. 251-252, 656-657, 708-719.*
Laoutaris, Nikolaos. Stavrakakis, Ioannis. "An analytical design of optimal playout schedulers for packet video recievers". Sep. 11, 2002. pp. 1-15.*

* cited by examiner

*Primary Examiner* — Robert Fennema
(74) *Attorney, Agent, or Firm* — Townsend and Townsend and Crew LLP

(57) ABSTRACT

An isochronous processor includes a state register, a functional unit, a control module, and an activation unit. The state register includes an arm buffer and an active buffer. The functional unit performs a transformation operation on the data stream in response to an active value of the control parameter obtained from the active buffer. The control module updates the arm value of the control parameter in the arm buffer in response to control instructions. The activation unit detects a load event propagating with the data stream and transfers the parameter value from the arm buffer to the active buffer in response to the load event. During this transfer, the control module is inhibited from updating the arm buffer.

24 Claims, 7 Drawing Sheets

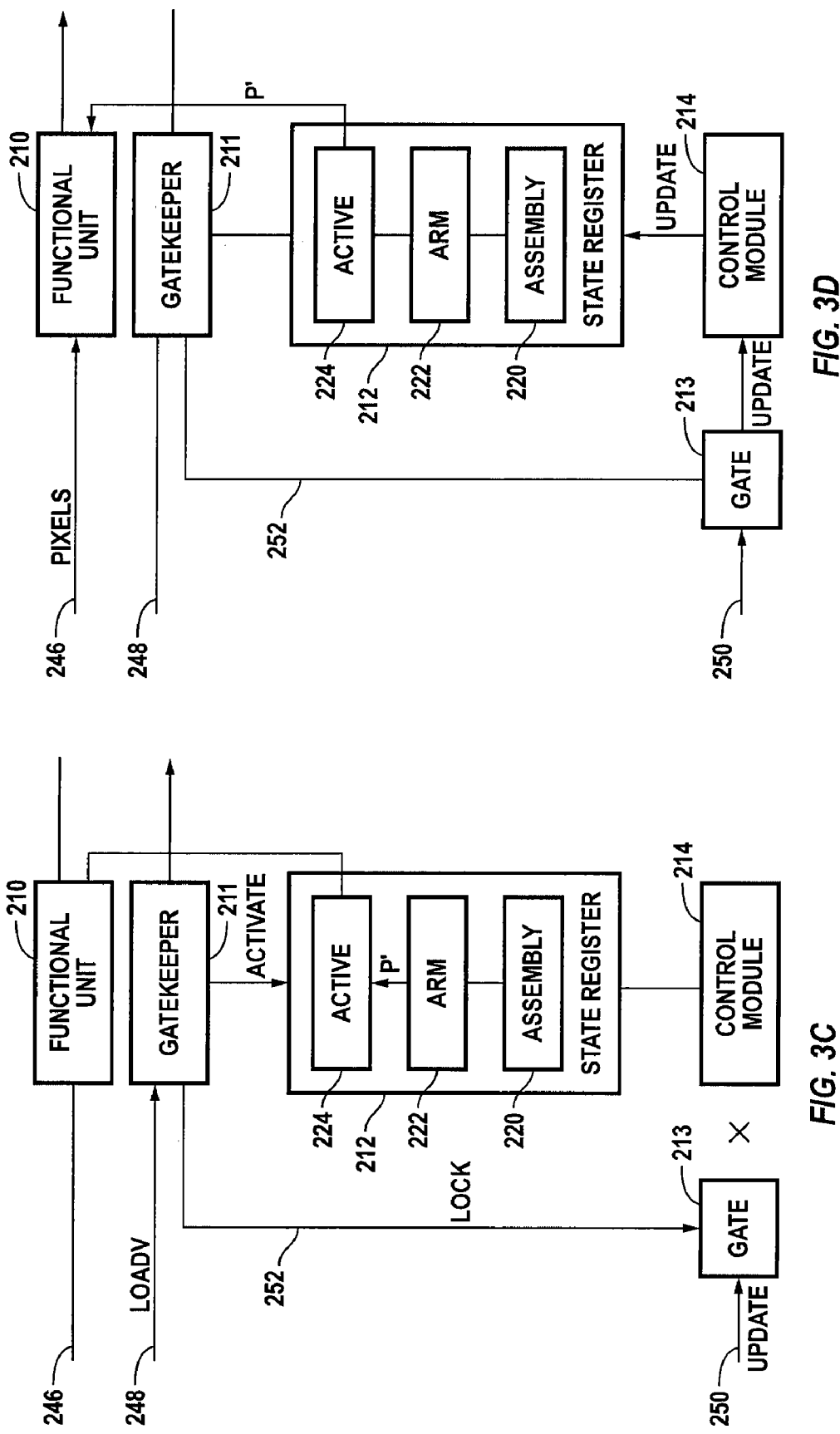

ISOCHRONOUS PIPELINED PROCESSOR WITH DETERMINISTIC CONTROL

BACKGROUND OF THE INVENTION

The present invention relates in general to data processing systems and in particular to an isochronous pipelined processor with deterministic control.

The typical personal computer system in use today includes a central processing unit (CPU) and a dedicated graphics co-processor. The graphics co-processor generally includes a video display pipeline that scans out the pixel buffer and provides pixel data to the display device at a fixed rate (e.g., 80 frames per second). The pixel data may be provided to the pixel buffer in response to various operating system and/or application programs executing on the CPU. Typically, the CPU also executes a driver program via which other programs can send commands to the graphics co-processor to specify various attributes (state parameters) of the output image. Attributes that can be specified may include display resolution (pixel density); color resolution (number of colors); position, size, and/or content of an overlay image (e.g., a cursor or video overlay); and so on, all of which might be controlled by a user or by various programs executing on the CPU. State parameters are typically stored in one or more state registers in the co-processor, where they can be updated in response to commands received from the CPU and accessed by the co-processor to control generation of the output image.

In most systems, the CPU and graphics co-processor operate asynchronously. Typically, the graphics co-processor has an associated command buffer in which commands received from the CPU are queued until execution. The CPU generally issues an instruction to the co-processor by writing a command to the command buffer, then proceeds to its next task without waiting for the command to execute. In such designs, there is no guarantee that state commands (i.e., commands updating the state parameters of the output pipeline) will arrive at the co-processor at a time when it is "safe" to execute them, i.e., when changing the state will not create artifacts in the image. For example, changing the display resolution in mid-frame, generally makes the image look torn. Likewise, changing the position of a cursor or other image element in mid-frame can also lead to tearing. To avoid such artifacts, typical co-processors are designed to synchronize updates to the state registers with "blanking periods" (dead time) in the pipeline, e.g., between the last pixel of one frame and the first pixel of the next frame.

Synchronizing state updates with blanking intervals presents a number of challenges. First, the co-processor must be able to detect when a blanking interval occurs. This has traditionally been done by polling a register on the pixel data path to detect the blanking interval. Second, the co-processor must ensure that a complete, coherent set of state updates is committed before the blanking interval ends. If the display pipeline is short enough or the frame rate is low enough, an adequate blanking interval can be provided by speeding up the rate at which pixels are delivered to the pipeline during each frame to allow for more dead time between frames. The co-processor can simply wait for the last pixel of the old frame to clear the pipeline, then execute the state commands before the first pixel of the next frame enters the pipeline.

Over time, however, frame rates and display resolutions (i.e., pixels per frame) have both increased, display pipelines have become longer, the number of adjustable state parameters has increased. Consequently, pipeline dead time between frames has been reduced, while the number of state parameters that may need to be updated during that dead time has increased to the point where in some co-processors it is no longer satisfactory to simply wait for the blanking interval and then begin issuing state commands. To reduce the time needed to commit the state updates, some co-processors now include double-buffered state registers having "assembly" and "active" buffers. The co-processor can execute state commands as they are received (i.e., at any point during a frame) by updating the assembly buffer while the current frame is generated using the active buffer. When the blanking interval arrives, the content of the assembly buffer can quickly be copied to the active buffer for use in processing the next frame.

This arrangement allows a large number of state updates to be made in a short period, but it creates a race condition between updates to the assembly buffer and transfers from the assembly buffer to the active buffer. For example, if the blanking interval arrives while state commands are being executed to update the assembly buffer, it is impossible to predict or guarantee that the data will be transferred from the assembly buffer to the active buffer either before or after a particular update to the assembly buffer. Thus, it is not guaranteed that the state parameters transferred into the active buffers will include a complete and coherent set of values. In addition, the pipeline behavior is non-deterministic; executing the same set of instructions (with the same image data) multiple times may produce different results due to the race condition. A non-deterministic pipeline makes verification of the co-processor's operation difficult (because the correct behavior is unpredictable) and in some instances may also produce visible artifacts in displayed images.

The problem of race conditions is further complicated in co-processors where the display pipeline is longer than the blanking interval. In such cases, the pipeline cannot be completely emptied between frames because the first pixel of the new frame enters the pipeline before the last pixel of the previous frame exits. If the same state registers are used for the entire pipeline, some of the pixels may be processed using the wrong parameters. This problem has been addressed in some systems by duplicating the state registers at different points (stages) along the pipeline. Each stage is made to be shorter than the blanking interval, so that each stage is empty of pixels at some point between frames, and the state registers at each stage may be double buffered. In this arrangement, updates to the assembly buffer are propagated through the successive pipeline stages, and transfers from the assembly buffer to the active buffer at each stage is synchronized with the blanking period in that stage. Where a race condition exists, however, it is possible that, at one stage, a state command will execute before the transfer from the assembly buffer to the active buffer while at a later stage the reverse will happen. Thus, in addition to being non-deterministic, the state may also be internally inconsistent so that the same pixel is processed using post-update state parameters at one stage and pre-update state parameters at another stage, making visual artifacts even more likely.

It would therefore be desirable to provide a display pipeline in which state can be controlled in a deterministic manner.

BRIEF SUMMARY OF THE INVENTION

Embodiments of the present invention provide an isochronous pipelined processor with deterministic control, such as a video processor for generating images on a display device. As used herein, an isochronous processor includes any data processing device that is configured to receive input data and/or deliver output data on a prescribed schedule (e.g., in accordance with a frame rate). Deterministic control is provided through various mechanisms described in detail below.

According to one aspect of the present invention, a processor configured to process an isochronous data stream includes a state register, a functional unit, a control module, and an activation unit. The state register includes an arm buffer and an active buffer, each of which is configured to store a respective value of a control parameter. The functional unit, which is coupled to the state register, is configured to perform a transformation operation on the data stream in response to an active value of the control parameter, the active value being obtained from the active buffer. The control module, which is also coupled to the state register, is configured to receive a stream of control instructions and to update an arm value of the control parameter in the arm buffer in response to the control instructions. The activation unit is coupled to detect a load event propagating with the data stream and is configured to update the active value of the control parameter by transferring the arm value from the arm buffer to the active buffer in response to the load event. The activation unit is further configured to inhibit the control module from updating the arm buffer while the active buffer is being updated. In some embodiments, the activation unit may include a gate module configured to deliver the stream of control instructions to the control module and further configured to suspend delivery of the stream of control instructions during the load event. Control instructions received while delivery is suspended may be queued, and the queued control instructions may be delivered to the control module after the load event.

In some embodiments, the state register may also include an assembly buffer, and the control instructions may include a set instruction instructing the control module to store an assembly value for the control parameter in the assembly buffer and an update instruction instructing the control module to transfer the assembly value from the assembly buffer to the arm buffer.

In some embodiments, the processor may also include a command dispatch unit that is coupled to an input of the control module and configured to dispatch the stream of control instructions. The command dispatch unit may be further configured such that a control instruction for updating the arm value is not dispatched in coincidence with the load event.

According to another aspect of the present invention, a processor configured to process an isochronous data stream includes a pipeline having a plurality of sequentially coupled stages and an input module. The input module configured to dispatch the isochronous data stream and a stream of control instructions into the pipeline. Each stage of the pipeline includes a state register, a functional unit, a control module, and an activation unit. The state register includes an arm buffer and an active buffer, each of which is configured to store a respective value of a control parameter. The functional unit, which is coupled to the state register, is configured to perform a transformation operation on the data stream in response to an active value of the control parameter, the active value being obtained from the active buffer. The control module, which is also coupled to the state register, is configured to receive a stream of control instructions and to update an arm value of the control parameter in the arm buffer in response to the control instructions. The activation unit is coupled to detect a load event propagating with the data stream and is configured to update the active value of the control parameter by transferring the arm value from the arm buffer to the active buffer in response to the load event. The activation unit is further configured to inhibit the control module from updating the arm buffer while the active buffer is being updated. The functional unit of each stage propagates the transformed data stream to the functional unit of the next stage until the end of the pipeline is reached, and the control unit of each stage propagates the stream of control instructions to the activation unit of the next stage.

The processor may be, for example, a graphics processor in which the isochronous data stream is a stream of pixel data describing an image. The load event may correspond to a blanking period between the last pixel of one frame and the first pixel of the next frame.

According to yet another aspect of the present invention, a method for processing a data stream is provided. The data stream is propagated in a data path, where the data path includes a functional unit configured to perform a transformation operation on the data stream in response to an active value of a control parameter. A load event is also propagated, where the load event is synchronized with the data stream. Control instructions are propagated in a control path in parallel with the data path; the control instructions are propagated to a control module configured to update an arm value of the control parameter in response thereto. In response to the load event reaching the functional unit, propagation of the control instructions for updating the arm value of the control parameter is suspended while the active value of the control parameter is updated to match the arm value. Thereafter, propagation of the control instructions is resumed.

The following detailed description together with the accompanying drawings will provide a better understanding of the nature and advantages of the present invention.

BRIEF DESCRIPTION OF THE DRAWINGS

FIGS. 3A-D are a series of snapshot illustrations of the operation of a state register of the scanout module of FIG. 2;

DETAILED DESCRIPTION OF THE INVENTION

Embodiments of the present invention provide an isochronous pipelined processor with deterministic control, including video processors for generating images on a display device. As used herein, an isochronous processor includes any data processing device that is configured to receive input data and/or deliver output data on a prescribed schedule. For instance, an isochronous video processor may be configured to deliver output signals to a display device at a prescribed frame rate. In some such processors, the prescribed frame rate, and thus the data delivery schedule, might be an adjustable parameter. Deterministic control is provided through various mechanisms, including a triple buffered state register with assembly, arm, and active registers; synchronization of a control path that manages updating of the assembly and arm registers with the data path; and management of the transition of data from the arm to active registers within the data path.

Figure 1:
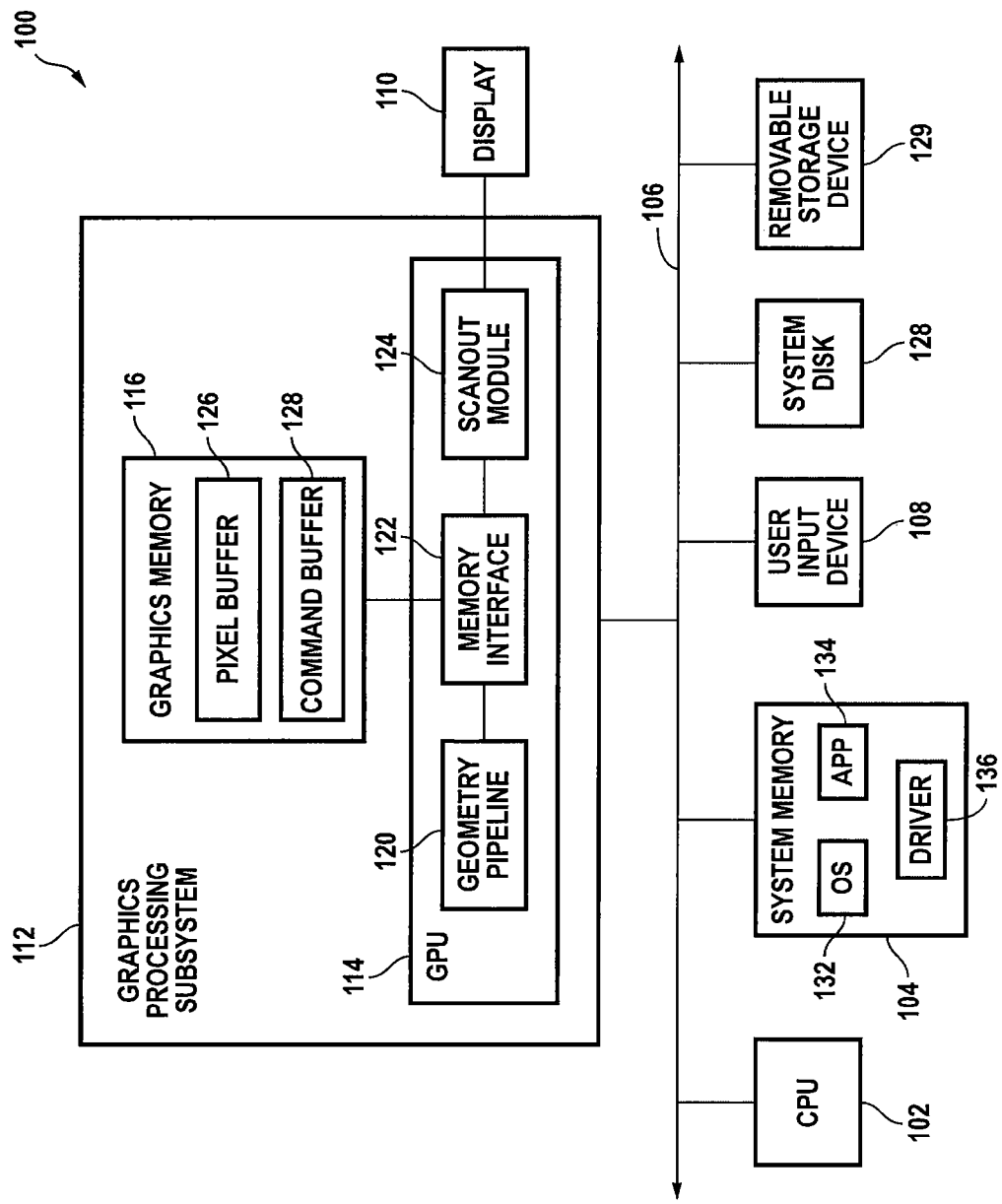
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 128 and other components, such as one or more removable storage devices 129 (e.g., floppy disk drive, compact disk (CD) drive, and/or DVD drive), may also be coupled to system bus 106. System bus 106 may be implemented using one or more of various bus protocols including PCI (Peripheral Component Interconnect), AGP (Advanced Graphics Processing) and/or PCI-Express (PCI-E); appropriate "bridge" chips such as a north bridge and south bridge (not shown) may be provided to interconnect various components and/or buses.

Graphics processing subsystem 112 includes a graphics processing unit (GPU) 114 and a graphics memory 116, which may be implemented, e.g., using one or more integrated circuit devices such as programmable processors, application specific integrated circuits (ASICs), and memory devices. GPU 114 includes a graphics pipeline 120, a memory interface module 122, and a scanout module 124. Graphics pipeline 120 may be configured to perform various tasks related to generating pixel data from graphics data supplied via system bus 106 (e.g., implementing various 2D and or 3D rendering algorithms), interacting with graphics memory 116 to store and update pixel data, and the like. Memory interface module 122, which communicates with graphics pipeline 120 and scanout control logic 124, manages all interactions with graphics memory 116. Memory interface module 122 may also include pathways for writing pixel data received from system bus 106 to graphics memory 116 without processing by graphics pipeline 120. The particular configuration of graphics pipeline 120 and memory interface module 122 may be varied as desired, and a detailed description is omitted as not being critical to understanding the present invention.

Graphics memory 116, which may be implemented using one or more integrated circuit memory devices of generally conventional design, may contain various physical or logical subdivisions, such as a pixel buffer 126 and a command buffer 128. Pixel buffer 126 stores pixel data for an image (or for a part of an image) that is read and processed by scanout control logic 124 and transmitted to display device 110 for display. This pixel data may be generated, e.g., from 2-D or 3-D scene data provided to graphics pipeline 120 of GPU 114 via system bus 106 or generated by various processes executing on CPU 102 and provided to pixel buffer 126 via system bus 106. In some embodiments, pixel buffer 126 can be double buffered so that while data for a first image is being read for display from a "front" buffer, data for a second image can be written to a "back" buffer without affecting the currently displayed image. Command buffer 128 is used to queue commands received via system bus 106 for execution by graphics pipeline 120 and/or scanout module 124, as described below. Other portions of graphics memory 116 may be used to store data required by GPU 114 (such as texture data, color lookup tables, etc.), executable program code for GPU 114 and so on.

Scanout module 124, which may be integrated in a single chip with GPU 114 or implemented in a separate chip, reads pixel color data from pixel buffer 118 and transfers the data to display device 110 to be displayed. In one embodiment, scanout module 124 operates isochronously, scanning out frames of pixel data at a prescribed refresh rate (e.g., 80 Hz) regardless of any other activity that may be occurring in GPU 114 or elsewhere in system 100. In some embodiments, the prescribed refresh rate can be a user selectable parameter, and the scanout order may be varied as appropriate to the display format (e.g., interlaced or progressive scan). Scanout module 124 may also perform other operations, such as adjusting color values for particular display hardware and/or generating composite screen images by combining the pixel data from pixel buffer 126 with data for a video or cursor overlay image or the like, which may be obtained, e.g., from graphics memory 116, system memory 104, or another data source (not shown). Such operations are performed in a display pipeline of scanout module 124 described below.

During operation of system 100, CPU 102 executes various programs that are (temporarily) resident in system memory 104. In one embodiment, these programs include one or more operating system (OS) programs 132, one or more application programs 134, and one or more driver programs 136 for graphics processing subsystem 112. It is to be understood that, although these programs are shown as residing in system memory 104, the invention is not limited to any particular mechanism for supplying program instructions for execution by CPU 102. For instance, at any given time some or all of the program instructions for any of these programs may be present within CPU 102 (e.g., in an on-chip instruction cache and/or various buffers and registers), in a page file or memory mapped file on system disk 128, and/or in other storage space.

Operating system programs 132 and/or application programs 134 may be of conventional design. An application program 134 may be, for instance, a video game program that generates graphics data and invokes appropriate rendering functions of GPU 114 (e.g., graphics pipeline 120) to transform the graphics data to pixel data. Another application program 134 may generate pixel data and provide the pixel data to graphics processing subsystem 112 for display. It is to be understood that any number of application programs that generate pixel and/or graphics data may be executing concurrently on CPU 102. Operating system programs 132 (e.g., the Graphical Device Interface (GDI) component of the Microsoft Windows operating system) may also generate pixel and/or graphics data to be processed by graphics card 112.

Driver program 136 enables communication with graphics processing subsystem 112, including both graphics pipeline 120 and scanout module 124. Driver program 136 advantageously implements one or more standard application program interfaces (APIs), such as OpenGL, Microsoft DirectX, or D3D for communication with graphics card 112; any number or combination of APIs may be supported, and in some embodiments separate driver programs 136 are provided to implement different APIs. By invoking appropriate API function calls, operating system programs 132 and/or application programs 134 are able to instruct driver program 136 to transfer graphics data or pixel data to graphics card 112 via system bus 106, to control operations of graphics pipeline 120, to modify state parameters for scanout module 124 and so on. The specific commands and/or data transmitted to graphics card 112 by driver program 136 in response to an API function call may vary depending on the implementation of GPU 114, and driver program 136 may also transmit commands and/or data implementing additional functionality (e.g., special visual effects) not controlled by operating system programs 132 or application programs 134.

In some embodiments, command buffer 128 queues the commands received via system bus 106 for execution by GPU 114. More specifically, driver program 136 may write a command stream to command buffer 128; the stream may include rendering commands and data for graphics pipeline 120 as well as state commands for scanout module 124. In some embodiments, command buffer 128 may include logically or physically separate sections for commands directed to graphics pipeline 120 and commands directed to display pipeline 124; in other embodiments, the commands may be intermixed in command buffer 128 and directed to the appropriate pipeline by suitable control circuitry within GPU 114.

Command buffer 128 (or each section thereof) is advantageously implemented as a first-in, first-out buffer (FIFO) that is written by CPU 102 and read by GPU 114. Reading and writing can occur asynchronously. In one embodiment, CPU 102 periodically writes new commands and data to command buffer 128 at a location determined by a "put" pointer, which CPU 102 increments after each write. Asynchronously, GPU 114 may continuously read and process commands and data sets previously stored in command buffer 128. GPU 114 maintains a "get" pointer to identify the read location in command buffer 128, and the get pointer is incremented after each read. Provided that CPU 102 stays sufficiently far ahead of GPU 114, GPU 114 is able to render images without incurring idle time waiting for CPU 102. In some embodiments, depending on the size of the command buffer and the complexity of a scene, CPU 102 may write commands and data sets for frames several frames ahead of a frame being rendered by GPU 114. Command buffer 128 may be of fixed size (e.g., 5 megabytes) and may be written and read in a wraparound fashion (e.g., after writing to the last location, CPU 102 may reset the "put" pointer to the first location).

In some embodiments, execution of rendering commands by graphics pipeline 120 need not be synchronized with operation of scanout module 124. For example, where pixel buffer 126 is double buffered as mentioned above, graphics pipeline 120 can freely overwrite the back buffer while scanout module 120 reads from the front buffer. Thus, graphics pipeline 120 may read and process commands as they are received. Flipping of the back and front buffers can be synchronized with the end of a scanout frame as is known in the art. For example, when graphics pipeline 120 has completed a new image in the back buffer, operation of graphics pipeline 120 may be paused until the end of scanout for the current frame, at which point the buffers may be flipped. Various techniques for implementing such synchronization features are known in the art, and a detailed description is omitted as not being critical to understanding the present invention.

It will be appreciated that the system described herein is illustrative and that variations and modifications are possible. A GPU may be implemented using any suitable technologies, e.g., as one or more integrated circuit devices. The GPU may be mounted on an expansion card that may include one or more such processors, mounted directly on a system motherboard, or integrated into a system chipset component (e.g., into the north bridge chip of one commonly used PC system architecture). The graphics processing subsystem may include any amount of dedicated graphics memory (some implementations may have no dedicated graphics memory) and may use system memory and dedicated graphics memory in any combination. In particular, the pixel buffer may be implemented in dedicated graphics memory or system memory as desired. The scanout circuitry may be integrated with a GPU or provided on a separate chip and may be implemented, e.g., using one or more ASICs, programmable processor elements, other integrated circuit technologies, or any combination thereof. In addition, the GPU may be incorporated into a variety of devices, including general purpose computer systems, video game consoles and other special purpose computer systems, DVD players, and the like.

Figure 2:
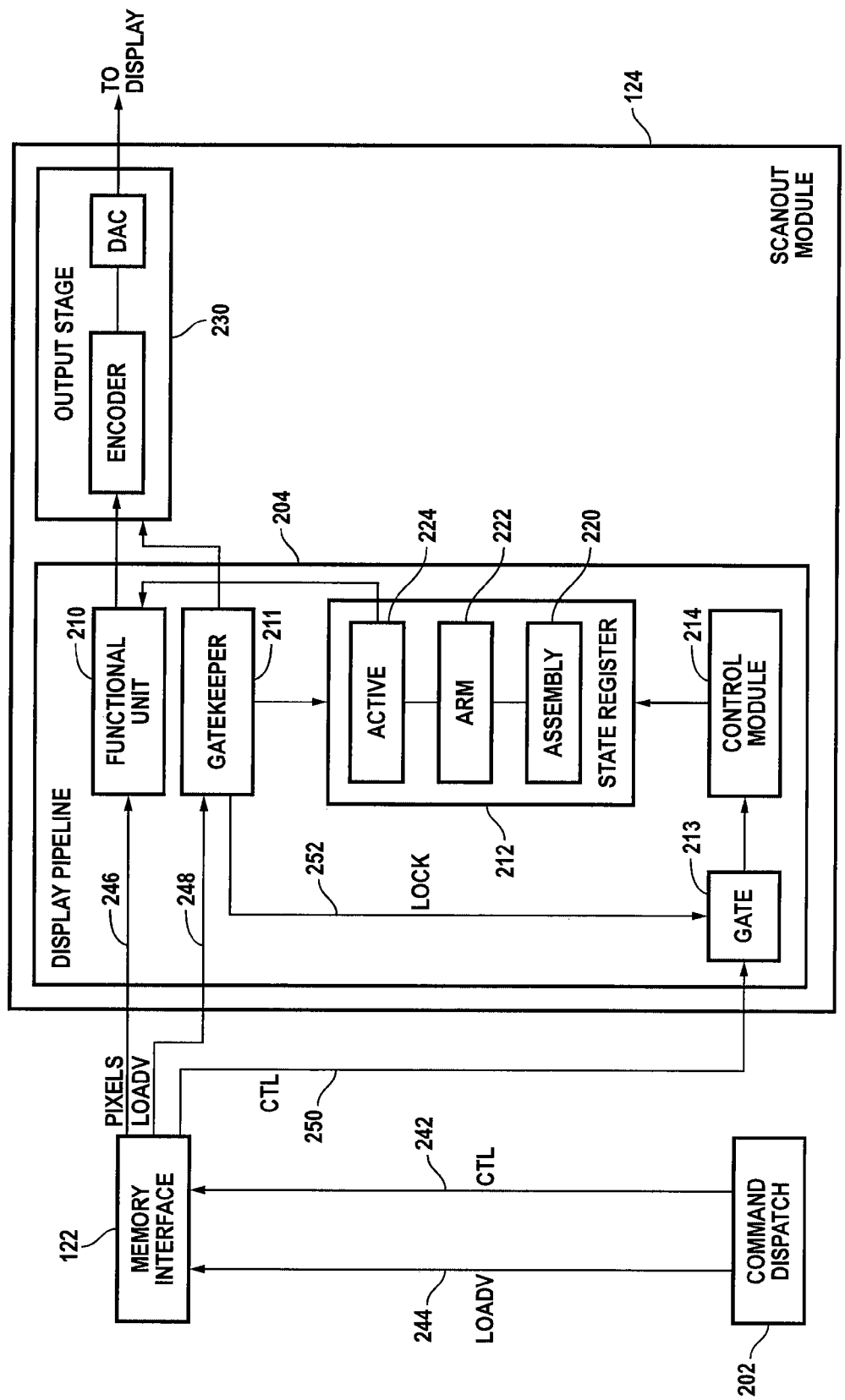
FIG. 2 is a block diagram of a scanout module according to an embodiment of the present invention.

In accordance with an embodiment of the present invention, execution of state commands by scanout module 124 is advantageously coordinated with scanout operations so that state updates occur at "safe" times, e.g., between frames. FIG. 2 is a block diagram of a scanout module 124 according to an embodiment of the present invention. Scanout module 124 includes a command dispatch unit 202, a display pipeline 204, and an output section 230. Command dispatch unit 202, in conjunction with memory interface 122, issues control instructions and pixel data to display pipeline 204 as described below.

Display pipeline 204 includes a functional unit 210, a gatekeeper module 211, a state register 212, a gate module 213, and a control module 214. State register 212, which may be implemented using any type of data storage circuitry, is triple buffered, with an assembly buffer 220, an arm buffer 222, and an active buffer 224. Functional unit 210 obtains state parameter values from active buffer 224. As described further below, new state parameters are written to assembly buffer 220 and transferred from assembly buffer 220 to arm buffer 222 under control of control module 214, then transferred from arm buffer 222 to active buffer 224 under control of gatekeeper module 211. Gatekeeper module 211 interacts with gate module 213 to prevent an update to arm buffer 222 from occurring while data from arm buffer 222 is being transferred to active buffer 224.

Output section 230, which may be of generally conventional design, may include, e.g., an encoder 232 and a digital to analog converter (DAC) 234 configured to generate analog output signals in a format suitable for a particular display device. In other embodiments, output section 230 may generate digital output signals in addition to or instead of analog output signals.

In operation, command dispatch unit 202 receives incoming state commands (e.g., from command buffer 128 described above) and dispatches corresponding control instructions (CTL) on a control path 242. Command dispatch unit 202 also generates "loadV" signals indicating the end of a frame on a separate signal line 244. In one embodiment, the loadV signal is a binary signal that is asserted during the blanking interval between frames and deasserted other times. Command dispatch unit 202 is advantageously configured to establish a relative timing between the control instructions and loadV events (e.g., assertions of the loadV signal) that avoids race conditions; specific examples are described below.

Memory interface 122 receives the control instructions and loadV signals from command dispatch unit 202 and issues these instructions in coordination with a data stream to display pipeline 204. The data stream, which is provided via data lines 246, includes the pixel data for each frame and may be generated, e.g., by scanning out pixel buffer 126 described above. Memory interface 122 also forwards the loadV signals received on signal line 244 to display pipeline 204 via signal lines 248 and forwards the control instructions received on control lines 242 via control lines 250. The delivery of the data stream on data lines 246 is advantageously coordinated with forwarding the loadV signals on signal lines 248, e.g., so that each loadV event occurs between the last pixel of one frame and the first pixel of the next frame. The relative timing between the loadV events and the control instructions established by command dispatch unit 202 is preserved. Configuration and operation of command dispatch unit 202 and memory interface 122 are described further below.

Control module 214 receives control instructions on control path 250. In this embodiment, the control instructions include "set" instructions and "update" instructions. Each set instruction includes an address (or other location identifier) for a state register and a parameter value to be written to the specified address. (In some embodiments, a set instruction may provide addresses and parameter values for multiple locations.) In response to a set instruction, control module 214 writes the data to the specified location in assembly buffer 220 of state register 212. In response to an update instruction, control module 214 transfers data from assembly buffer 220 to arm buffer 222 (this transfer is referred to herein as an "update transfer"). In some embodiments, the update transfer involves copying the entire content of assembly buffer 220 to corresponding locations in arm buffer 222. In other embodiments, a parameter in a particular location in assembly buffer 220 is only transferred if that location has been overwritten since the last update. In still other embodiments, each update instruction includes an address (or group of addresses) for which data is to be transferred. The set and update instructions may have any format that is recognizable by control module 214.

Functional unit 210, which may be a programmable device or a special-purpose circuit, receives the data stream on data path 246, processes the pixel data to transform it for display, and provides the transformed data to output section 230. Functional unit 210 may perform various transformations on the pixel data, such as composition of images using overlays, rescaling of image size, visible area selection, downfiltering, dithering, and the like. Numerous examples of such transformations are known in the art, and a detailed description is omitted as not being critical to understanding the present invention.

Some or all of these transformations may be controlled by various state parameters. For example, state parameters for an overlay may specify the size, position, and data source for the overlay; state parameters for resizing the display may specify the target size; and so on. Functional unit 210 obtains any state parameters it may require from active buffer 224 of state register 212.

Gatekeeper module 211 receives the loadV signals on signal path 248. In response to a loadV event (e.g., assertion of the loadV signal), gatekeeper module 211 initiates a transfer of state parameters (referred to herein as an "activation transfer") from arm buffer 222 of state register 212 to active buffer 224. In some embodiments, gatekeeper module 211 may introduce a fixed delay between receiving the loadV event and initiating the activation transfer in order to allow the last pixel prior to the loadV event to clear functional unit 210 prior to updating any active state parameters.

During the activation transfer, gatekeeper module 211 asserts a lock signal on a signal line 252. The lock signal is advantageously asserted shortly before the activation transfer begins and deasserted shortly after it ends. In one embodiment, gatekeeper module 211 asserts the lock signal as soon as a loadV event is received (e.g., on the transition of the loadV signal from the deasserted state to the asserted state) and deasserts the lock signal after the end of the loadV event (e.g., after the loadV signal transitions back to the deasserted state); the activation transfer may happen at any time during the loadV event and may require any amount of time up to the duration of the loadV event.

In response to assertion of the lock signal on line 252, gate module 213 enters a "locked" state in which it suspends delivery of instructions on control path 250 to control module 214. Instruction delivery remains suspended for as long as the lock signal remains in the asserted state. Gate module 213 may include a buffer (e.g., a FIFO) to queue any instructions that may accumulate while delivery is suspended so that instructions are not dropped from control path 250 but merely delayed. Once gate module 213 is unlocked (which occurs when the lock signal on line 252 is deasserted), queued instructions are delivered to control module 214 in the order in which they were received. In some embodiments, gate module 213 may suspend delivery of all instructions while it is locked. In other embodiments, gate module 213 may continue to deliver instructions while in the locked state until such time as an update instruction is received; delivery of the update instruction (as well as any subsequent instructions) is suspended until gate module 213 is unlocked.

Figure 3B:
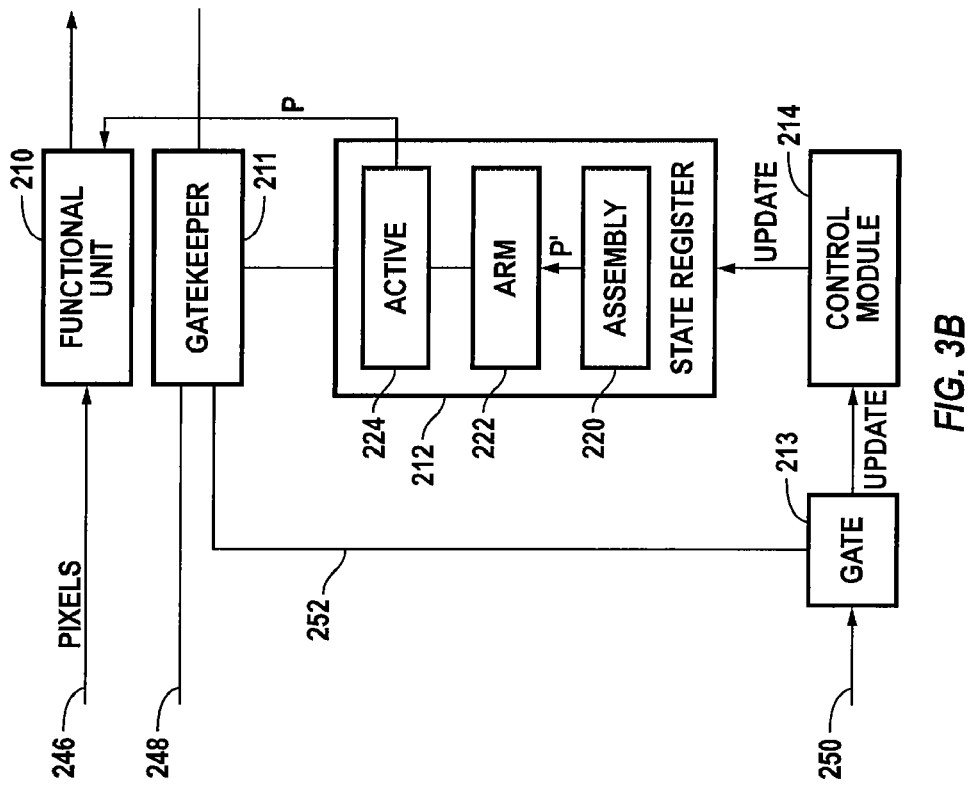
Figure 3A:
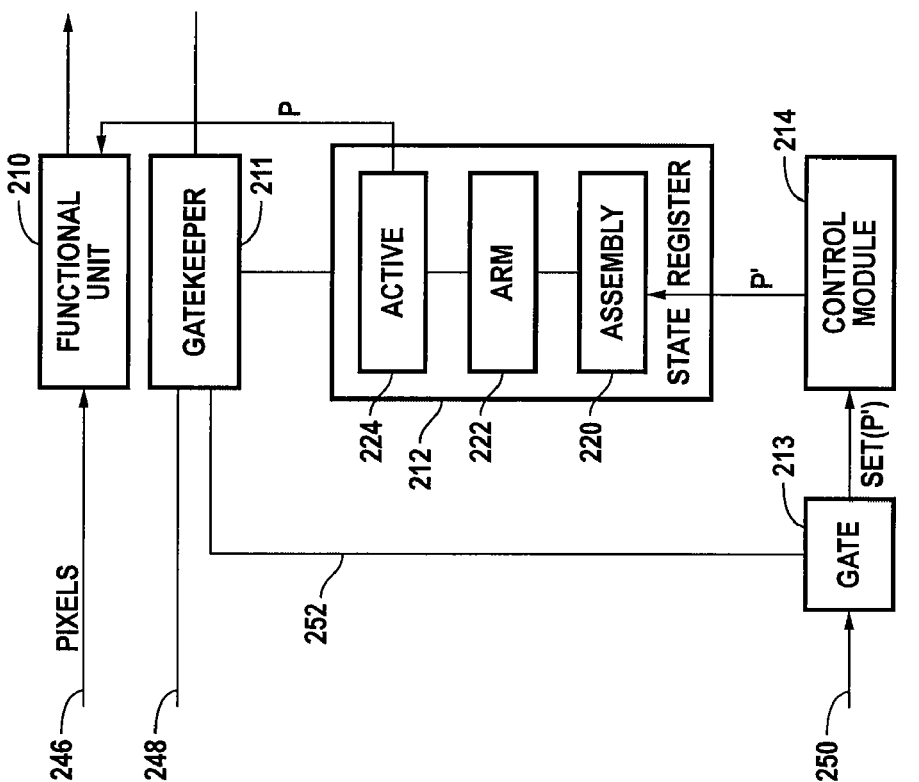

FIGS. 3A-D illustrate the operation of state register 212 via a series of snapshots. In FIG. 3A, at some point in time, control module 214 receives a set instruction (with a new parameter value P') via control path 250. In response, parameter P' is written to a location in assembly buffer 220. In the meantime, functional unit 210 may be processing pixels using a parameter value (P) from active buffer 224 as shown. It should be noted that the set instruction may also coincide with a loadV event on signal line 248. In this case, if gate module 213 allows the set instructions to proceed while it is locked, parameter P' may be written to assembly buffer 220 while an activation transfer (from arm buffer 222 to active buffer 224) is occurring. In either case, the operation of functional unit 210 is not affected by the new parameter value P'.

In FIG. 3B, at a later time, control module 214 receives an update instruction via control path. (At this time, gate module 213 is unlocked.) In response to the update instruction, control module 214 initiates an update transfer of parameter value P' from assembly buffer 220 to arm buffer 222, while functional unit 210 continues to process pixels using parameter value P from active buffer 224.

In FIG. 3C, at a still later time, gatekeeper module 211 receives the next loadV event on signal line 248. In response to this event, gatekeeper module 211 asserts the lock signal on line 252, thereby locking gate 213, then initiates an activation transfer of parameter value P' from arm buffer 222 to active buffer 224. During this time, another update command on control path 250 is received by gate 213. This command is suspended and queued for later delivery.

Thereafter, as shown in FIG. 3D, the loadV event ends and functional unit 210 begins to process pixels using parameter value P' from active buffer 224. Gatekeeper module 211 deasserts the lock signal on line 252, unlocking gate 213. Gate 213 then delivers the update command to control module 214, which initiates another update transfer.

As this sequence illustrates, the control instructions (e.g., set and update) modify the assembly and arm buffers but have no immediate effect on the image being generated. The instructions take effect only after the activation transfer from the arm buffer to the active buffer. The activation transfer is coordinated with the loadV event (which in this embodiment represents the end of a frame), so that state changes take effect only between frames. It should be noted that gatekeeper module 211 is advantageously configured to initiate the activation transfer after functional unit 210 has finished processing the last pixel before the loadV event and before the first pixel after the loadV event arrives. In addition, gatekeeper module 211 advantageously asserts the lock signal far enough in advance of initiating the activation transfer to allow control module 214 to complete any update instructions that may have been delivered before gate module 213 was locked. In this manner, activation of a new state can be coordinated to occur at a safe time (represented by the loadV event).

It should also be noted that a coherent state is generally available in the arm buffer provided that the set and update instructions are in an order such that updates occur at points when the state in the assembly buffer is known to be coherent. To maintain state coherence, any number of set instructions may be placed between updates; for example, if a display is being resized in both horizontal (X) and vertical (Y) dimensions, an instruction sequence "set(X); set(Y); update" might be used.

Race conditions and non-deterministic behavior might still occur if activation transfers (which are controlled by loadV events) overlap in time with update transfers (which are controlled by update instructions). In some embodiments, command dispatch unit 202 can dispatch the state commands and the loadV signals with a relative timing that is not changed as the data propagates (via memory interface 122) into display pipeline 204; within pipeline 204, this timing can be enforced by gatekeeper module 211 and gate module 213 as described above. Accordingly, race conditions can be avoided as long as command dispatch unit 202 is configured to avoid dispatching update instructions concurrently with a loadV event. An example of such a configuration will now be described.

Figure 4:
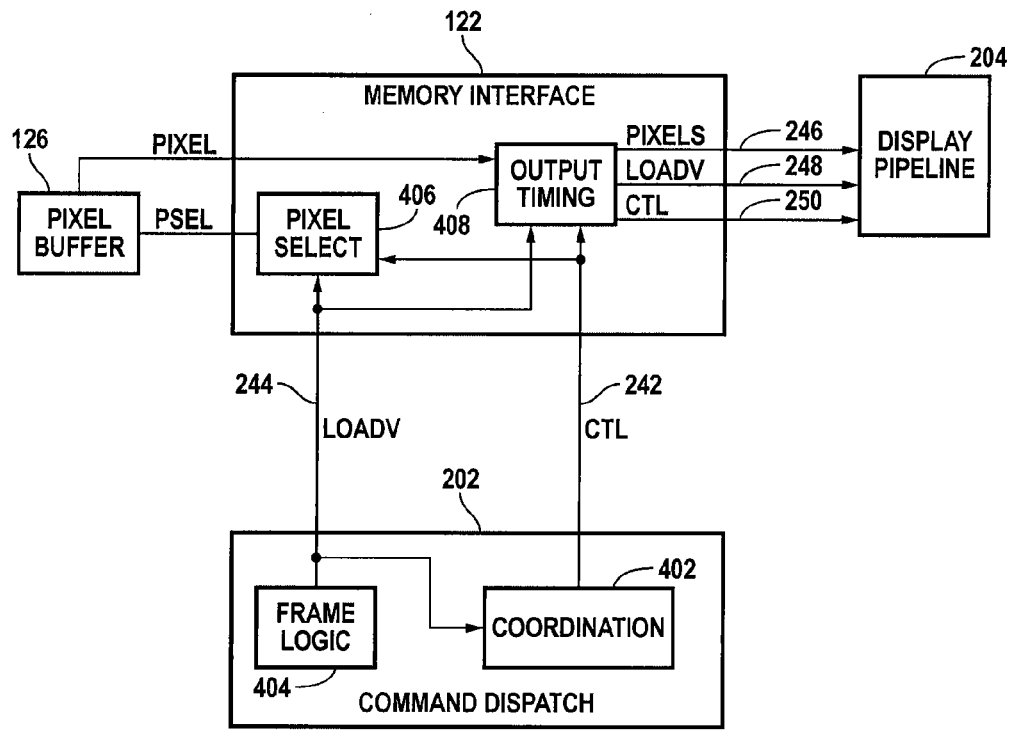
FIG. 4 is a block diagram of a command dispatch circuit and a memory interface according to an embodiment of the present invention.

FIG. 4 is a block diagram of command dispatch unit 202 and memory interface 122 according to an embodiment of the present invention. Command dispatch unit 202 includes a coordination circuit 402 for generating instructions corresponding to state commands and a frame logic circuit 404 for generating loadV signals.

In operation, frame logic circuit 404 generates signals for loadV events on signal line 242 at the prescribed frame rate and provides the loadV signal to coordination circuit 402 as well as to memory interface 122. LoadV events may be generated in various ways. In one embodiment, frame logic circuit 404 receives a signal from memory interface 122 each time a new pixel is transmitted on data path 246. Frame logic circuit 404 maintains a count of pixels that have been sent; when that count reaches a prescribed threshold, frame logic circuit 404 generates a loadV event and resets the counter. In another embodiment, memory interface 122 maintains a count of sent pixels for the current frame and sends a signal to frame logic circuit 404 when the count reaches a prescribed threshold. In response to this signal, frame logic circuit 404 generates a loadV event; memory interface 122 may reset its pixel count in response to receiving this loadV event on signal line 244 or when all of the pixels for the current frame have been sent. In either case, the thresholds may correspond to the number of pixels per frame and may further be modified to account for any pixels that might be sent between the time the count reaches the threshold and the time the next loadV event is received by memory interface 122.

Coordination circuit 402 receives state commands for the display pipeline and dispatches an appropriate sequence of set and update instructions on control lines 242 with the desired timing relative to loadV signals on signal line 244. In general, any change of state specified by a state command can be carried out via a sequence of one or more set instructions that modify state parameters in assembly buffer 220 followed by an update instruction that initiates a transfer of the modified state from assembly buffer 220 to arm buffer 224. In some embodiments, the state commands may be provided to coordination circuit 402 as sequences of set and update instructions; in other embodiments, coordination circuit 402 may include additional circuitry for decoding received state commands into sequences of set and update instructions.

In some embodiments, execution of set instructions is allowed at any time, and coordination circuit 402 may dispatch a set instruction onto control path 242 as soon as it is received. Update instructions are coordinated with loadV events according to a timing rule. In one embodiment, the timing rule is that loadV events act as fences for update instructions (and vice versa). That is, each update instruction is dispatched to control path 242 between two loadV events on signal path 248. Once dispatched according to this rule, the update instruction remains between those two loadV events throughout the length of display pipeline 204, and the relative timing may be preserved, e.g., by providing appropriate timing circuitry (e.g., delay units, etc.) along signal paths 244, 248 and/or control paths 242, 250.

In some embodiments, not all state commands are required to be visible; that is, the state parameters may be updated multiple times during a frame, with some of the updates not being used to generate any images. For example, in a personal computer system, the CPU may send state commands for updating the cursor position (e.g., in response to signals from a mouse or other pointing device) at a rate much higher than the frame rate. Whichever update is received last before a new frame would be used as the position for the new frame. To allow for such multiple updating, coordination circuit 402 is advantageously configured to allow any number of update instructions to be dispatched between two loadV events. For example, in the case of the cursor position, each received state command for the cursor position may be placed on the control path using a set instruction (or in some instances two set instructions) for the new position followed by an update instruction to transfer the new position parameters to arm buffer 222.

In other instances, updates may be required to be visible for at least one frame or more than one frame. Thus, in some embodiments, visibility of a given state can be controlled by coordination circuit 402 using a "presentation interval" parameter (PI) associated with each state command. This parameter determines the minimum number of frames that are to be generated using the state, specified in that command. For example, in the case of state commands for updating mouse position or other updates that need not be visible, PI may be set to 0. For state commands for which visibility is required, PI may be set to 1 or a higher number. Where a nonzero PI is specified, coordination circuit 402 may delay dispatching of any subsequent update commands until the specified number of loadV events have been received from frame logic circuit 404.

Figure 5:
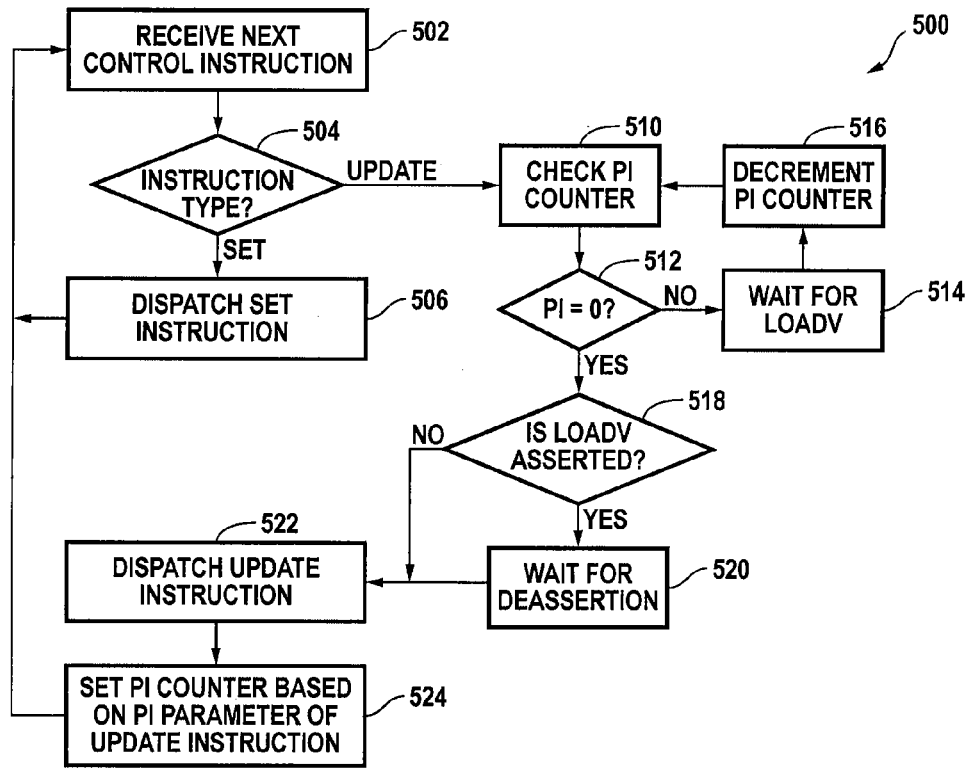
FIG. 5 is a flow diagram illustrating a process for issuing control instructions onto the control path according to an embodiment of the present invention.

FIG. 5 is a flow diagram illustrating a process 500 for dispatching set and update instructions to control path 242 that may be implemented in coordination circuit 402. In this embodiment, coordination circuit 402 maintains a PI counter that is initialized to the PI value associated with a given update when that update is issued and decremented each time a loadV event is received from frame logic circuit 404. The next update is issued when the PI counter reaches zero.

More specifically, at step 502, the next state command is received. In this embodiment, state commands are provided as set-and-update instruction sequences; in other embodiments, step 502 might include decoding a received state command into a set-and-update instruction sequence, with each instruction in the sequence being processed in turn by the remaining steps of process 500. At step 504, the instruction type (set or update) is determined. If the instruction is a set instruction, it is dispatched on control line 242 at step 506, and process 500 returns to step 502 to process the next instruction.

If the instruction is an update instruction, then at step 510, the PI counter value (which may be initialized to zero or some other value at system startup) is examined. At step 512, it is determined whether the PI counter value is zero. If not, processing pauses at step 514 until the next loadV event is received from frame logic circuit 404. In response to the loadV event, the PI counter is decremented at step 516 and checked again (step 510). These steps can be repeated until the PI counter reaches zero. As long as the update is being held, subsequent control instructions are not processed, and coordination circuit 402 may include instruction buffers to queue any control instructions that are received while an update is being held.

Once the PI counter has reached zero, coordination circuit 402 determines (step 518) whether a loadV event is in progress, e.g., whether the loadV signal is asserted. If so, processing is paused at step 520 until the loadV event ends, e.g., until the loadV signal is deasserted. At that point, the update instruction is dispatched on control line 242 at step 522. After dispatching the update instruction, process 500 sets the PI counter to the PI parameter value associated with the just-dispatched update (step 524) and returns to step 502 for the next instruction.

It will be appreciated that the process described herein is illustrative and that variations and modifications are possible. Steps described as sequential may be executed in parallel, order of steps may be varied, and steps may be modified or combined. In some embodiments, each update instructions results in all data from assembly buffer 220 being transferred to arm buffer 222; in other embodiments, each update instruction may specify a particular location (or locations) in assembly buffer 220 to be transferred. In one alternative embodiment where update instructions specify a location, coordination circuit 404 may be configured to allow set and update instructions for different locations to be dispatched out of order with respect to each other; for example, set and update instructions for a first location might be dispatched while an update instruction for a second location is being held.

Memory interface 122 includes a pixel select circuit 406 and an output timing circuit 408. Pixel select circuit 406, which may be of generally conventional design, selects a current pixel (e.g., by scanning across lines of pixels in a raster array, with the current pixel being incremented according to a pixel clock signal) and generates a pixel select signal (PSEL) for pixel buffer 126. This signal causes the color value for the selected pixel (represented, e.g., as RGB components) to be transmitted to output timing circuit 408 of memory interface 122.

In some embodiments, operation of pixel select circuit 406 may be responsive to the control instructions and/or loadV events. For example, in response to a loadV event (e.g., at the end of a frame), pixel select circuit 406 may delay selection of the next pixel for a preselected time interval, thereby creating a gap (blanking period) between the last pixel of one frame and the first pixel of the next. In one embodiment, the blanking period may correspond to a vertical retrace interval for a conventional CRT display device. In other embodiments, the blanking period may be made as short as desired or eliminated entirely; the last pixel of one frame, a loadV event, and the first pixel of the next frame can occur in succession with no gap between them. As another example, control instructions might be used to determine which pixel to select as the first pixel of the new frame (e.g., if pixel buffer 126 stores pixels covering an area larger than the visible region), whether to scan pixel buffer 126 in interlaced or progressive fashion, and so on.

Output timing circuit 408 forwards pixels from pixel buffer 126 onto data path 246, forwards control instructions from control path 242 onto control path 250, and forwards loadV events on signal line 244 to signal line 248. Output timing circuit 408 imposes the correct relative timing between the pixels on data path 246 and loadV events on signal line 248 so that the loadV events occur between the last pixel of one frame and the first pixel of the next frame. In addition, output timing circuit 408 preserves the relative timing between loadV events and instructions on the control path. For example, output timing circuit 408 may introduce delay in the loadV signal path to account for a latency associated with accessing pixel buffer 126. The amount of delay introduced in the loadV signal path would also be introduced in the control path. Output timing circuit 408 may be configured as desired so long as the coincidence between blanking periods in pixel data path 246 and loadV events on signal line 248 is preserved, and so long as the relative timing between loadV events received on signal line 244 and control instructions received on signal line 242 is preserved.

In this embodiment, coordination circuit 402 provides deterministic behavior for display pipeline 204 by coordinating the dispatch of update instructions in the control path with loadV events. With this coordination at the input end of the pipeline, conflicts or race conditions may be avoided as long as display pipeline 204 maintains the order between the update instructions and loadV events that it receives, e.g., by the interaction of gatekeeper module 211 and gate module 213. Those of ordinary skill in the art will recognize that in a system such as that of FIG. 1 with scanout module 124 implemented as described above, it is not necessary for driver program 136 (or any other programs executing on CPU 102) to be aware of loadV events in real time or to coordinate the state commands with the activities of scanout module 124. These programs can simply specify a sequence of desired modifications to the state of the scanout path by transmitting appropriate state commands to GPU 114 at any time. Coordination circuit 402 coordinates the requested state modifications and loadV events to deterministically produce a state that reflects the received state commands.

It will be appreciated that the scanout module described herein is illustrative and that variations and modifications are possible. The circuitry described herein may be implemented using conventional integrated circuit technologies and may incorporate any suitable data storage technologies or other technologies. The logic flow described herein may be varied as desired, and the behavior of the display pipeline is deterministically controlled provided that update instructions are issued between loadV events. Use of presentation interval parameters and counters as described herein is also illustrative. In some embodiments, all updates might be allowed to be overwritten before being used, while in other embodiments, there might be only one update per frame.

In addition, a load event other than the loadV event described above may be used to initiate activation transfers. For example, a pixel stream for a conventional CRT display device generally includes a short blanking period at the end of each scan line to allow for horizontal retrace. A "loadH" event can be defined to coincide with the end of a scan line, allowing activation transfers to occur at this point as well. In other embodiments, the coordination circuit may be configured to delay issuing an update until a given time arrives, with time being measured in number of frames, internal processor clock cycles, system clock cycles, or any other desired time measurement. More generally, the coordination circuit can be configured to receive a signal corresponding to any selected event, and update instructions (as well as any subsequent set instructions) can be held until the selected event occurs.

As noted above, activation transfers advantageously occur at a time when functional unit 210 is empty of pixels, e.g., after processing of the last pixel preceding the loadV event ends and before processing of the first pixel following the loadV event begins. Where a sufficiently long blanking period in data path 246 coincides with each loadV event, functional unit 210 will become empty during that period.

Figure 6:
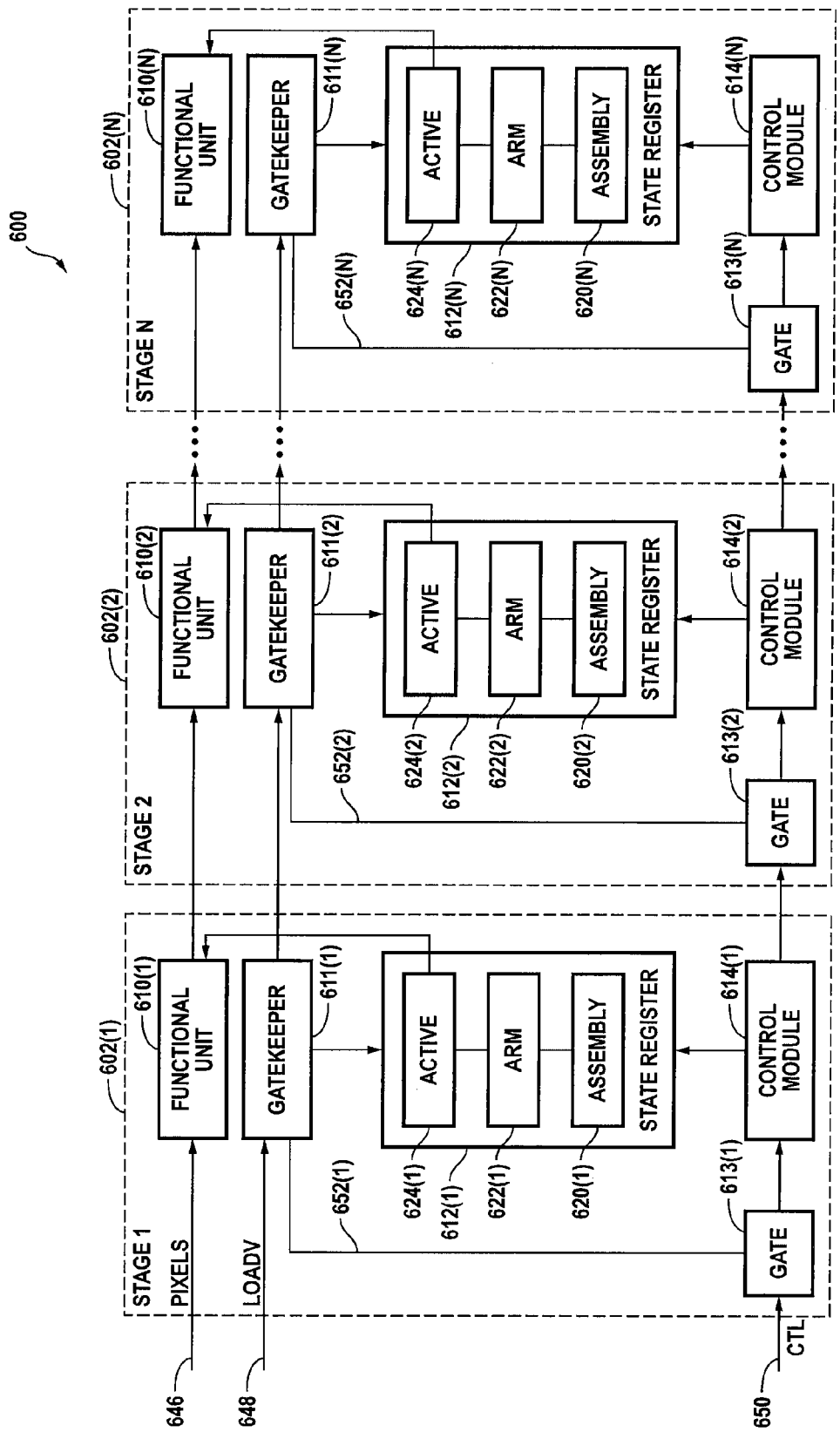
FIG. 6 is a block diagram of a multi-stage processing pipeline according to an embodiment of the present invention.

In some embodiments, it may be undesirable to have a blanking period long enough to allow the pipeline to become empty. Accordingly, the display pipeline shown in FIG. 2 may be extended to a multi-stage pipeline in which different stages may be empty of pixels at different times and the active buffer for each stage is updated when that stage is empty. FIG. 6 is a block diagram of an N-stage pipeline (where N may be any integer) according to an embodiment of the present invention; therein, multiple instances of like objects are denoted with reference numbers identifying the object and parenthetical numbers identifying the instance. Each stage 602(k) ($1 \leq k \leq N$) includes a functional unit 610(k); a gatekeeper module 611(k) a triple-buffered state register 612(k) having an assembly buffer 620(k), an arm buffer 622(k), and an active buffer 624(k); a gate module 613(k); and a control module 614(k). Pixel data is placed onto a data path 646, loadV signals are placed onto a signal line 648, and control instructions (e.g., set and update instructions as described above) are placed onto a control path 650. It will be appreciated that circuits and techniques generally similar to those described above with reference to FIG. 4 may be used to provide data and control instructions to pipeline 600.

As in the single-stage embodiment described above, each gatekeeper 611(k) asserts a lock signal on a signal line 652(k) in response to receiving the loadV event on signal line 648; the lock signal on line 652(k) locks gate module 613(k), which suspends delivery to control module 614(k) of any update instructions that gate module 613(k) may receive until such time as gate module 613(k) is unlocked. Because each stage 612(k) has its own gatekeeper 611(k) and gate module 613(k), which operate in response to the loadV event propagating to that stage 612(k), the relative timing between loadV events on signal line 648 and update instructions on control path 650 can be maintained through any number of pipeline stages.

Along data path 646, pixel data flows from each functional unit 610(k) to the next functional unit 610(k+1); functional unit 610(N) provides the final pixel data to an output stage (not shown), which may be generally similar to output stage 230 described above. Each functional unit 610(k) may perform various transformations on the pixel data, including any of the transformations mentioned above, based on state parameters obtained from its respective active buffer 624(k). In general, pipeline 600 may include as many stages 602(k) as desired, with each stage 602(k) performing one or more of a sequence of transformations on the pixel data. LoadV events propagate on signal path 648 in coincidence with blanking periods in the pixel data. The number and length of stages 602(k) are advantageously selected such that each stage 602(k) becomes empty of pixels during the loadV event for a long enough time to complete an activation transfer from arm buffer 622(k) to active buffer 624(k). It should be understood that it is not necessary for all stages 602(k) to be simultaneously empty.

The control path 650 is also pipelined, with control instructions (e.g., set and update instructions as described above) propagating from control module 614(k) to control module 614(k+1) until they reach control module 614(N) at the last stage of pipeline 600, after which they may be discarded or forwarded to other system components as desired. The control instructions are executed by each control module 614(k) as they are received, and the propagation of control instructions along control path 650 is advantageously regulated by gate modules 613(k) in conjunction with gatekeeper modules 611(k) so that an update instruction does not pass a loadV event that preceded it when the instruction was dispatched.

It will be appreciated that in multi-stage pipeline 600, the blanking period need be only long enough to allow the longest stage 602(k) to be emptied of pixels. Because additional stages can be added to pipeline 600 as desired, the blanking period can be made shorter by adding more stages and reducing the processing time for each stage. Thus, the blanking period can be made as short as desired simply by adding more stages, provided that the activation transfer can be completed within that period. The duration of the load event (which controls the locking and unlocking of gate modules 613(k)) advantageously coincides with the blanking period; alternatively, it can be shorter than the blanking period, provided that it lasts long enough for the activation transfer to be completed, including any delay in initiating the activation transfer that may be provided to allow an in-progress update transfer to be completed. It will be appreciated that the update and activation transfers can be made very fast using suitable storage and transfer circuitry.

In some multi-stage embodiments, different stages 602(k) may be designed for specific tasks (e.g., one stage might be designed for overlaying a cursor while another stage is designed to resize the image), and a given stage might need only a subset of the state parameters to perform its task. The state registers 612(k) and control module 614(k) for a given stage 602(k) may be configured to store and modify only the parameters needed by that stage. In other embodiments, all state parameters may be stored and modified at each stage 602(k), regardless of whether the functional unit 610(k) accesses a particular state parameter or not.

Multithreaded pipelines with one or more stages may also be provided. A multithreaded pipeline provides independent parallel processing paths that may share various hardware resources, such as the functional units. The threads may be asynchronous so that at any given time, different threads may have different state parameter values or different pixel data. For example, in a scanout module that supports multiple overlays (e.g., cursor and video), one thread might be devoted to processing the pixels for each overlay while yet another thread is devoted to processing pixels for the underlying (base) image. Each thread may maintain its own state independently of the others, but all threads that generate an image for the same display device share the same loadV events.

Figure 7:
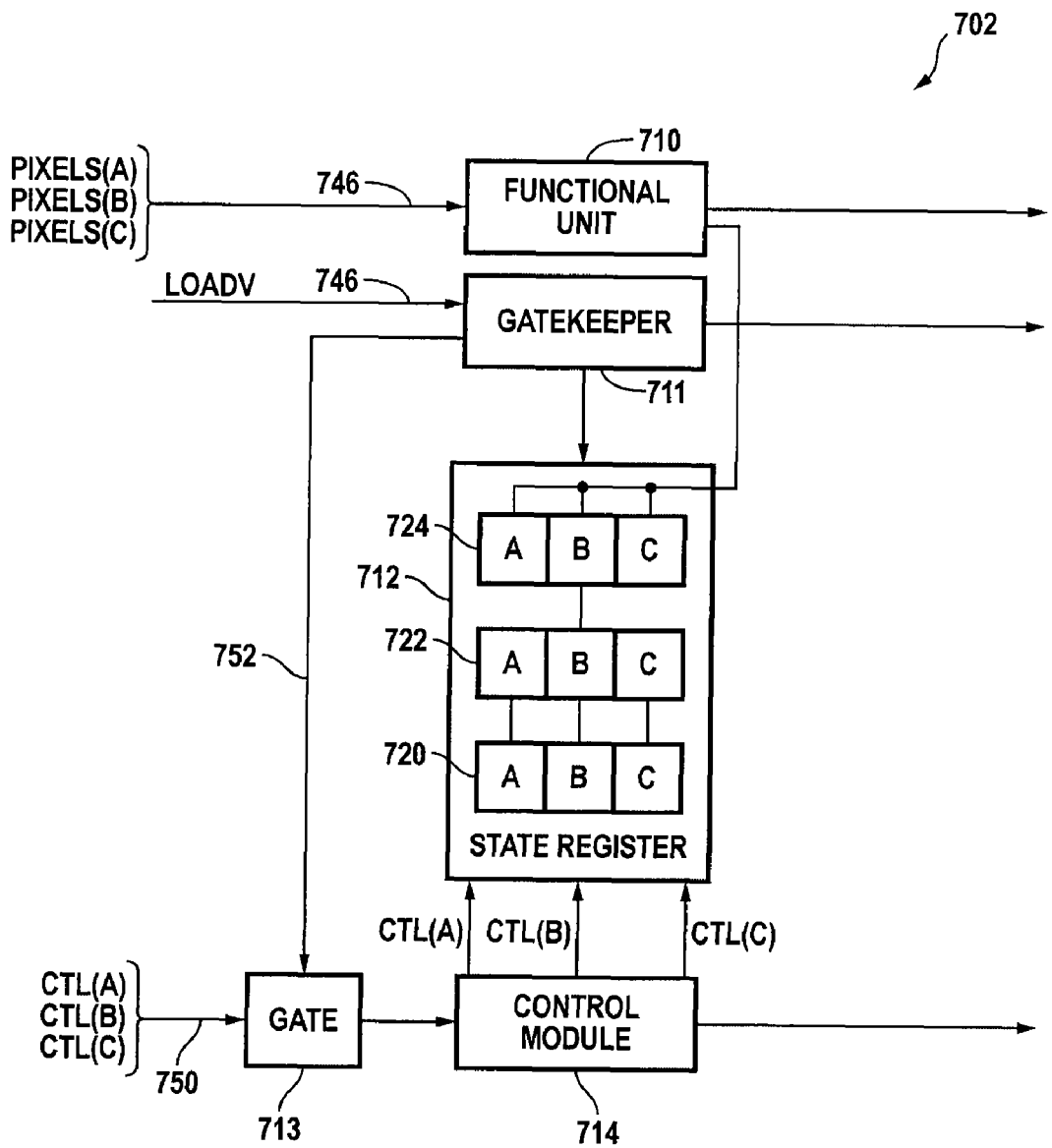
FIG. 7 is a block diagram of a pipeline stage for a multi-threaded pipeline according to an embodiment of the present invention.

FIG. 7 illustrates a pipeline stage 702 for a multithreaded pipeline that supports three threads (referred to herein as A, B, and C) according to an embodiment of the present invention. Pipeline stage 702 is generally similar to the pipeline stages shown in FIG. 6 and includes a functional unit 710, a gatekeeper module 711, a state register 712, a gate module 713, and a control module 714. State register 712 includes an assembly buffer 720, an arm buffer 722, and an active buffer 724, each of which is physically or logically divided among the three threads. Each subdivision may store a complete set of state parameters for its thread.

Functional unit 710 receives pixel data for the various threads on a data path 746. In some embodiments, a separate data path may be provided for each thread; in other embodiments, data segments for all threads may be multiplexed onto the same path, with each data segment being accompanied by a thread identifier. Functional unit 710 processes the data for each thread using the state parameters in the appropriate section of active buffer 724; for instance, data belonging to thread A is processed using state parameters from active buffer section 724A; data belonging to thread B is processed using state parameters from active buffer section 724B; and data belonging to thread C is processed using state parameters from active buffer section 724C.

Control module 714 receives control instructions (e.g., set and update instructions) for the various threads on a control path 750. The control instructions are advantageously made thread specific, e.g., by providing separate control paths for each thread, by using different thread-specific addresses for state register 712, or by including a thread identifier as an additional parameter of each instruction.

The logic for issuing control instructions onto control path 750 may be generally similar to that described above with reference to FIG. 4. A coordination circuit for multithreaded operation may be configured to allow control instructions for one thread to be dispatched out of order with respect to control instructions for another thread. For instance, if the coordination circuit is waiting to dispatch an update instruction for thread A (e.g., at steps 510-516 shown in FIG. 5), instructions for threads B and C may continue to be dispatched during this time.

The state of any given thread can be modified independently of other threads. For instance, a set instruction for thread A may be executed by writing new a parameter value to assembly buffer section 720A. An update instruction for thread B may be executed by transferring parameter values from assembly buffer section 720B to arm buffer section 722B without affecting the content of arm buffer section 722A (or section 722C). The loadV event is shared among the threads, as noted above; thus, in response to a loadV event, gatekeeper module 711 initiates an activation transfer of all sections of arm buffer 722 to corresponding sections of active buffer 724 and locks gate module 713 to prevent an update instruction for any thread (as well as any subsequent instructions for any thread) from entering control module 714 while the activation transfer is in progress. If, when a loadV arrives, a particular thread (e.g., thread B) has not updated its arm buffer section 722B since the last loadV, the active state for thread B does not change since the content of arm buffer section 722B has not changed. Thus, each thread can change its state independently of other threads.

In some embodiments, it may be desirable to coordinate updates between two or more threads. This can be done, e.g., by including a "set_wait" command in the command stream received by the coordination circuit. The set_wait command belongs to a specific thread (e.g., thread A) and specifies the identifier of another thread (e.g., thread B) as a parameter. If the coordination circuit receives a set_wait(B) command in thread A, it holds back any update instructions received thereafter in thread A until the next update instruction in thread B is received; at that time, an atomic update for both threads is issued. "Atomic" in this context means that the update transfer for both threads is guaranteed to occur during the same frame (e.g., between the same two loadV events). In one embodiment, the atomic update is a single update instruction identified with both threads. Threads may be decoupled by inserting a "set_no_wait" command into the command stream of the thread that had the earlier set_wait instruction. In response to a set_no_wait(B) instruction in thread A, the coordination circuit discontinues holding the updates for thread A to wait for thread B.

It should be noted that the set_wait command is unidirectional. For example, when set_wait(B) is received in thread A, subsequent update commands in thread B may continue to be issued without waiting for an update command in thread A. To fully interlock the two threads, set_wait commands can be placed into both command streams. For example, a set_wait(B) command in thread A may be accompanied (or preceded or followed) by a set_wait(A) command in thread B. Thereafter, the threads are interlocked: when the coordination circuit receives an update in either thread, it holds the update until it receives the next update in the other thread, at which time an atomic update for both threads is issued.

In some embodiments, more than two threads may be interlocked by using one of the threads as a "main" thread and interlocking it with each of two or more "satellites." For example, threads A, B, and C may be interlocked by selecting thread A as the main thread, placing set_wait(B) and set_wait(C) commands in main thread A, and placing a set_wait(A) command in each of satellite threads B and C. The coordination circuit receives these commands and interlocks thread A with each of the other two threads so that an update received in any one of the threads is held until updates have been received in all three of the threads, at which time an atomic update for all three threads is issued.

Other variations on multithreading are possible. For example, in some embodiments, some state parameters may be common to all threads; a "global" section (not shown) in each of buffers 720, 722, 724 can be provided for such parameters. This global section can be updated in the assembly and arm buffers by control module 714 in response to control instructions in any thread. Like the thread-specific sections described above, any parameter values in the global section of arm buffer 722 would be transferred to a corresponding section in active buffer 724 on each loadV. Alternatively, globally shared parameters may be managed by providing a "global" thread including control instructions that modify a corresponding parameter in each thread-specific section 720A-C of assembly buffer 720.

While the invention has been described with respect to specific embodiments, one skilled in the art will recognize that numerous modifications are possible. For instance, in some embodiments, further coordination between state commands and rendering commands received by a GPU may be achieved. For example, there may be a single command stream including rendering commands as well as state commands. The command dispatch unit for state commands described herein can be implemented as part of a larger dispatch unit that also decodes (if necessary) and dispatches rendering commands to the graphics pipeline. Dispatching of rendering commands can be coordinated with loadV events or with dispatching of particular control instructions if desired.

In addition, the gatekeeper and gate modules described herein are illustrative, and other mechanisms for maintaining the timing between activation transfers and update transfers may be provided. For example, where the length of time required to process a pixel at each stage of the pipeline is fixed, the control module at each stage may include appropriate timing circuitry so that control instructions for triggering an update transfer move to the next stage in time with the loadV signals for triggering an activation transfer.

In an alternative embodiment, the stream of control instructions may include a "fence" instruction that is dispatched onto the control path in coincidence with each loadV event. When the fence instruction reaches the control module at each pipeline stage, it checks for a coincidence with a loadV event. If the loadV event has not yet arrived, the control module may be configured to pause its processing of control instructions until the loadV event has passed through that stage. In yet another embodiment, each update instruction may be sent through the control path with a parameter indicating the number of loadV events since the last update instruction; the control module receives the loadV events as they propagate through the data path and counts the loadV events to ensure that the update instructions remain properly synchronized.

Further, some embodiments may use double buffering (e.g., arm and active buffers) rather than triple buffering for the control parameters. For instance, if each control parameter represents an independent "piece" of an overall state, assembly of control parameters in an assembly buffer may be omitted in favor of writing each parameter directly to the arm buffer. The assembly buffer is advantageously used to prepare new values in cases where control parameters are interdependent parts that together define a coherent state. For example, in the case of cursor position, the X and Y coordinates might be separate parameters but should be updated together to reflect the actual state changes of the cursor.

In addition, transfer of state information into active registers may occur at any "safe" time and is not limited to occurring during the time between frames. Accordingly, it should be understood that the loadV events described herein may be augmented or replaced by other "load events" and that a load event may include any event or signal that indicates an opportunity to safely (e.g., without producing unwanted visual effects) modify the active state parameters. For example, pixel output paths are often configured to include a horizontal blanking period corresponding to the end of each scan line; thus, the end of a line may also be used as a load event if desired.

Still other embodiments of the present invention may also be adapted for use in isochronous processors other than video processors. As an example, a decoder for MPEG audio data may generate audio output signals at a fixed rate from encoded data. In accordance with MPEG standards, the encoded data is delivered in blocks, where each block was encoded using a certain combination of control parameter settings (i.e., a state) that should also be used to decode the block, and the state may be different for different blocks. In an MPEG decoding pipeline, the end of a current block may be used as a "load event" signaling that active state should be updated. Thus, parameters for the next block may be read and loaded into an arm buffer in advance of the end of the current block; between blocks, the new parameters can be transferred to an active buffer. More generally, embodiments of the invention may be adapted to provide deterministic control for any pipelined processor in which the data stream includes load events signaling when the pipeline or a stage thereof can safely (i.e., without departing from an intended result) modify its control parameters.

Thus, although the invention has been described with reference to specific embodiments, it will be appreciated that the invention is intended to cover all modifications and equivalents within the scope of the following claims.

What is claimed is:

1. A processor configured to process an isochronous data stream, the processor comprising:
   a state register including an assembly buffer, an arm buffer, and an active buffer, each buffer being configured to store a respective value of a control parameter;
   a functional unit coupled to the state register and configured to perform a transformation operation on the isochronous data stream in response to an active value of the control parameter, the active value being obtained from the active buffer;
   a control module coupled to the state register and configured to receive a stream of control instructions and to update an arm value of the control parameter in the arm buffer in response to the control instructions, wherein the control instructions include a set instruction instructing the control module to store an assembly value for the control parameter in the assembly buffer and an update instruction instructing the control module to transfer the assembly value from the assembly buffer to the arm buffer, and wherein each update instruction is associated with a presentation interval parameter specifying a number of load events to be received before another update instruction may be executed; and
   an activation unit coupled to receive a load signal propagating synchronously with the isochronous data stream, wherein the load signal defines a load event that begins with a transition of the load signal to an asserted state and ends with a transition of the load signal to a deasserted state,
   the activation unit being configured to detect the beginning of the load event and further configured to update the active value of the control parameter by transferring the arm value from the arm buffer to the active buffer in response to the load event,
   wherein the activation unit is further configured to inhibit the control module from updating the arm buffer by executing the update instruction while the active buffer is being updated.

2. The processor of claim 1, wherein the activation unit includes a gate module configured to deliver the stream of control instructions to the control module and further configured to suspend delivery of the stream of control instructions during the load event.

3. The processor of claim 2, wherein the gate module is further configured to queue control instructions received while delivery is suspended and to deliver the queued control instructions to the control module after the load event.

4. The processor of claim 1, further comprising:
   a command dispatch unit coupled to an input of the control module and configured to dispatch the stream of control instructions,
   wherein the command dispatch unit is further configured to avoid dispatching a control instruction for updating the arm value in coincidence with the load event.

5. The processor of claim 4, wherein the command dispatch unit is further configured to dispatch the stream of control instructions in response to a received command stream, wherein the received command stream is asynchronous with respect to the isochronous data stream.

6. The processor of claim 4, wherein the isochronous data stream includes data for a plurality of threads and the state register is configured to store an independent control parameter value for each of the plurality of threads.

7. The processor of claim 6, wherein the stream of control instructions include a first control instruction that instructs the control module to update the arm value of the control parameter for one of the plurality of threads independently of another one of the plurality of threads.

8. The processor of claim 7, wherein the activation unit is configured to transfer the arm values for all of the plurality of threads to the active buffer in response to the load event.

9. The processor of claim 7, wherein the command dispatch unit is further configured to interlock two or more of the plurality of threads by dispatching a second control instruction that instructs the control module to atomically update the respective arm values for all of the interlocked threads.

10. The processor of claim 1, wherein the activation unit is further configured to begin inhibiting the control module from updating the arm buffer in response to the transition of the load signal to the asserted state and to cease inhibiting the control module from updating the arm buffer in response to the transition of the load signal to the deasserted state.

11. The processor of claim 1, wherein the load signal enters the asserted state at the end of a frame and enters the deasserted state at the beginning of a next frame.

12. A processor configured to process an isochronous data stream, the processor comprising:
- a pipeline having a plurality of sequentially coupled stages; and
- an input module configured to dispatch the isochronous data stream and a stream of control instructions into the pipeline,
- wherein each stage of the pipeline includes:
- a state register including an assembly buffer, an arm buffer, and an active buffer, each buffer being configured to store a respective value of a control parameter;
- a functional unit coupled to the state register and configured to perform a transformation operation on the isochronous data stream in response to an active value of the control parameter, the active value being obtained from the active buffer;
- a control module coupled to the state register and configured to receive a stream of control instructions and to update an arm value of the control parameter in the arm buffer in response to the stream of control instructions, wherein the control instructions include a set instruction instructing the control module to store an assembly value for the control parameter in the assembly buffer and an update instruction instructing the control module to transfer the assembly value from the assembly buffer to the arm buffer, and wherein each update instruction is associated with a presentation interval parameter specifying a number of load events to be received before another update instruction may be executed; and
- an activation unit coupled to receive a load signal propagating synchronously with the isochronous data stream, wherein the load signal defines a load event that begins with a transition of the load signal to an asserted state and ends with a transition of the load signal to a deasserted state,
- the activation unit being configured to detect the beginning of the load event and further configured to update the active value of the control parameter by transferring the arm value from the arm buffer to the active buffer in response to the load event,
- wherein the functional unit of each stage propagates the transformed isochronous data stream to the functional unit of the next stage until the end of the pipeline is reached and wherein the control unit of each stage propagates the stream of control instructions to the activation unit of the next stage, and
- wherein each of the control modules is further configured to update the arm value of the control parameter by storing an assembly value of the control parameter in the assembly buffer and subsequently transferring the assembly value to the arm buffer.

13. The processor of claim 12, wherein the input module includes:
- a command dispatch unit coupled to an input of the control module and configured to dispatch the stream of control instructions,
- wherein the command dispatch unit is further configured such that an update instruction is not dispatched in coincidence with the load event.

14. The processor of claim 12, wherein the activation unit includes a gate module configured to deliver the stream of control instructions to the control module and further configured to suspend delivery of the stream of control instructions in the event that an update instruction is next to be delivered during the load event.

15. The processor of claim 14, wherein the gate module is further configured to queue control instructions received while delivery is suspended and to deliver the queued control instructions to the control module after the load event.

16. The processor of claim 12, wherein the activation unit is further configured to inhibit the control module from updating the arm buffer by executing the update instruction while the active buffer is being updated.

17. A graphics processor configured to process a pixel data stream, the processor comprising:
- a display pipeline having at least one stage;
- a pixel source configured to transmit the pixel data stream isochronously to the display pipeline, wherein the pixel stream is transmitted synchronously with a load signal that defines a sequence of load events, each load event beginning with a transition of the load signal to an asserted state and ending with a transition of the load signal to a deasserted state; and
- a coordination circuit configured to dispatch a stream of control instructions to the display pipeline in coordination with the sequence of load events,
- wherein each stage of the display pipeline includes:
- a state register including an assembly buffer, an arm buffer, and an active buffer, each buffer being configured to store a respective value of a control parameter;
- a functional unit coupled to the state register and configured to perform a transformation operation on the pixel data stream in response to an active value of the control parameter, the active value being obtained from the active buffer;
- a control module coupled to the state register and configured to receive a stream of control instructions and to update an arm value of the control parameter in the arm buffer in response to the control instructions, wherein the control instructions include a set instruction instructing the control module to store an assembly value for the control parameter in the assembly buffer and an update instruction instructing the control module to transfer the assembly value from the assembly buffer to the arm buffer; and
- an activation unit coupled to detect the beginning of each load event propagating with the pixel data stream and configured to update the active value of the control parameter by transferring the arm value from the arm buffer to the active buffer in response to the load event,
- wherein the activation unit is further configured to inhibit the control module from updating the arm buffer while the active buffer is being updated; and
- wherein, in the event that the display pipeline has more than one stage, the functional unit of each stage propagates the transformed pixel data stream to the functional unit of the next stage synchronously with the load signal until a last stage of the display pipeline is reached and wherein the control unit of each stage propagates the stream of control instructions to the activation unit of the next stage, and
- wherein each of the control modules is further configured to update the arm value of the control parameter by storing an assembly value of the control parameter in the assembly buffer and subsequently transferring the assembly value to the arm buffer.

18. The graphics processor of claim 17, wherein the load event corresponds to an interval in the pixel data stream between a last pixel of a previous frame and a first pixel of a next frame.

19. The graphics processor of claim 17, further comprising an output stage coupled to receive the transformed data stream from the last stage of the display pipeline and configured to generate a driving signal for a display device in response to the transformed data stream.

20. The graphics processor of claim 17, wherein the coordination circuit is further configured such that a control command for updating the arm value of the control parameter is not dispatched in coincidence with a load event.

21. The graphics processor of claim 17, wherein each update instruction is associated with a presentation interval parameter specifying a number of load events to be received before another update instruction may be executed.

22. A method for processing a data stream, the method comprising:
  propagating the data stream isochronously in a data path, the data path including a functional unit configured to perform a transformation operation on the data stream in response to an active value of a control parameter;
  propagating a load signal that defines a sequence of load events, each load event beginning with a transition of the load signal to an asserted state and ending with a transition of the load signal to a deasserted state, the propagation of the load signal being synchronized with the data stream;
  propagating control instructions in a control path in parallel with the data path, wherein the control instructions are propagated to a control module configured to update an arm value of the control parameter in response thereto, wherein the control instructions include a set instruction for storing an assembly value of the control parameter in an assembly buffer and an update instruction for copying the assembly value from the assembly buffer to an arm buffer, thereby updating the arm value, and wherein each update instruction is associated with a presentation interval parameter specifying a number of load events to be received before another update instruction may be executed; and
  in response to the beginning of the load event reaching the functional unit:
  suspending propagation of the control instructions for updating the arm value of the control parameter;
  updating the active value of the control parameter to match the arm value; and
  thereafter resuming propagation of the control instructions.

23. The method of claim 22, wherein suspending propagation of the control instructions for updating the arm value includes allowing a set instruction to be propagated and suspending propagation of a subsequent update instruction.

24. The method of claim 22, wherein the data stream, the load event, and the control instructions are propagated through a pipeline having a plurality of sequential stages, each stage having a functional unit and a control module, and wherein the acts of suspending propagation of the control instructions, updating the active value of the control parameter, and resuming propagation of the control instructions are performed at each of the sequential stages as the load event propagates thereto.

* * * * *